United States Patent

Mann et al.

[11] Patent Number: 5,830,571
[45] Date of Patent: *Nov. 3, 1998

[54] HEAT RESISTANT PRESSURE SENSITIVE ADHESIVE CONSTRUCTIONS

[75] Inventors: Roger H. Mann, Corona Del Mar; Edward I. Sun, Arcadia, both of Calif.

[73] Assignee: Avery Dennison Corporation, Pasadena, Calif.

[*] Notice: This patent issued on a continued prosecution application filed under 37 CFR 1.53(d), and is subject to the twenty year patent term provisions of 35 U.S.C. 154(a)(2).

[21] Appl. No.: 741,127

[22] Filed: Oct. 31, 1996

Related U.S. Application Data

[63] Continuation of Ser. No. 463,301, Jun. 5, 1995, abandoned.

[51] Int. Cl.[6] ................................................. B32B 7/12
[52] U.S. Cl. ........................ 428/343; 428/345; 428/354; 428/517
[58] Field of Search ................... 428/40.1, 345, 428/343, 352, 354, 355 R, 41.8, 517

[56] References Cited

U.S. PATENT DOCUMENTS

| | | | |
|---|---|---|---|
| 2,532,011 | 11/1950 | Dhalquist et al. | 154/53.5 |
| 2,718,666 | 9/1955 | Knox | 18/57 |
| 2,920,352 | 1/1960 | Miller et al. | 18/57 |
| 3,022,543 | 2/1962 | Baird, Jr. et al. | 18/57 |
| 3,036,945 | 5/1962 | Souza | 154/53.5 |
| 3,100,722 | 8/1963 | Hermann et al. | 117/138.8 |
| 3,154,461 | 10/1964 | Johnson | 161/116 |
| 3,187,982 | 6/1965 | Underwood et al. | 229/51 |
| 3,234,062 | 2/1966 | Morris | 156/104 |
| 3,309,452 | 3/1967 | Yumoto et al. | 264/284 |
| 3,354,506 | 11/1967 | Raley | 18/14 |
| 3,370,951 | 2/1968 | Hausenauer et al. | 96/87 |
| 3,382,206 | 5/1968 | Karickhoff | 260/40 |
| 3,468,744 | 9/1969 | Reinhart | 161/6 |
| 3,515,626 | 6/1970 | Duffield | 161/162 |
| 3,540,959 | 11/1970 | Connor | 156/203 |
| 3,658,574 | 4/1972 | Izzi et al. | 117/76 |
| 3,690,909 | 9/1972 | Finley | 117/6 |
| 3,741,253 | 6/1973 | Brax et al. | 138/137 |
| 3,841,943 | 10/1974 | Takashi et al. | 156/494 |
| 3,842,152 | 10/1974 | Wilfield et al. | 264/210 R |
| 3,871,947 | 3/1975 | Brekkem | 161/116 |
| 3,886,056 | 5/1975 | Kitamaru et al. | 204/159.2 |
| 3,894,904 | 7/1975 | Cook | 156/229 |
| 3,907,065 | 9/1975 | Stigen | 428/329 |
| 3,924,051 | 12/1975 | Wiggins et al. | 428/520 |
| 3,936,567 | 2/1976 | Vesely | 428/325 |
| 3,953,557 | 4/1976 | Brax et al. | 264/22 |
| 3,963,851 | 7/1976 | Toyoda | 428/305 |
| 3,968,196 | 7/1976 | Wiley | 264/171 |
| 3,979,000 | 9/1976 | Karabedian | 215/12 R |
| 4,008,115 | 2/1977 | Fairbanks et al. | 156/267 |
| 4,011,358 | 3/1977 | Roelofs | 428/287 |
| 4,020,215 | 4/1977 | Michaylov | 428/420 |
| 4,031,162 | 6/1977 | Brax et al. | 260/837 |
| 4,051,293 | 9/1977 | Wiley | 428/213 |
| 4,057,667 | 11/1977 | Wiggens et al. | 428/35 |
| 4,064,296 | 12/1977 | Bornstein et al. | 428/35 |
| 4,069,934 | 1/1978 | Karabedian | 215/12 R |
| 4,071,362 | 1/1978 | Takenaka et al. | 96/1.4 |
| 4,082,880 | 4/1978 | Zboril | 428/220 |
| 4,091,150 | 5/1978 | Roelofs | 428/57 |
| 4,100,237 | 7/1978 | Wiley | 264/406 |
| 4,118,438 | 10/1978 | Matsui et al. | 260/857 L |
| 4,172,163 | 10/1979 | Magnotta | 428/40 |
| 4,177,812 | 12/1979 | Brown et al. | 128/284 |
| 4,188,443 | 2/1980 | Mueller et al. | 428/216 |
| 4,224,262 | 9/1980 | Baird, Jr. et al. | 264/22 |
| 4,233,367 | 11/1980 | Ticknor et al. | 428/476.3 |
| 4,235,341 | 11/1980 | Martin et al. | 206/601 |
| 4,240,933 | 12/1980 | Copelin | 252/455 |
| 4,242,402 | 12/1980 | Korpman | 428/212 |
| 4,246,058 | 1/1981 | Reed | 156/183 |
| 4,254,169 | 3/1981 | Schroeder | 428/35 |
| 4,278,738 | 7/1981 | Brax et al. | 428/515 |
| 4,331,727 | 5/1982 | Maas | 428/213 |
| 4,343,851 | 8/1982 | Sheplak | 428/212 |
| 4,346,855 | 8/1982 | Biggar | 242/67.2 |
| 4,361,628 | 11/1982 | Krueger et al. | 428/475.8 |
| 4,377,050 | 3/1983 | Renholts | 40/615 |
| 4,377,616 | 3/1983 | Ashcraft et al | 428/213 |
| 4,379,806 | 4/1983 | Korpman | 428/354 |
| 4,380,567 | 4/1983 | Shigemoto | 428/213 |

(List continued on next page.)

FOREIGN PATENT DOCUMENTS

| | | |
|---|---|---|
| 888148 | 12/1971 | Canada . |
| 1138817 | 1/1983 | Canada . |
| 060421 | 9/1982 | European Pat. Off. . |
| 0490854A2 | 6/1992 | European Pat. Off. . |
| 2402120 | 8/1974 | Germany . |
| 58-113283 | 7/1983 | Japan . |
| 59-122570 | 7/1984 | Japan . |
| 633481 | 12/1982 | Switzerland . |
| 1465973 | 1/1974 | United Kingdom . |
| 1384556 | 2/1975 | United Kingdom . |
| 1404018 | 8/1975 | United Kingdom . |
| 1578517 | 11/1980 | United Kingdom . |

OTHER PUBLICATIONS

Hercules WT503,WT502/1S and WT502/2S, Product Bulletin, Hercules Incorporated, FC–170.

MicaFil 40, Information Sheet, DuPont Canada, Inc.

Opportunities and Requirements for Coerruded Beverage Bottle Labels, Paper by Michael C. Paddock at 1985, Coextrusion Conference, pp. 85–98.

*Primary Examiner*—Daniel Zirker
*Attorney, Agent, or Firm*—Renner, Otto, Boisselle & Sklar

[57] ABSTRACT

Heat resistant, pressure sensitive adhesive labels, tapes and similar constructions are provided, and comprise a heat resistant face stock laminated to a pressure sensitive adhesive and a release liner. In one embodiment, the face stock is a crosslinked polyolefin. In another embodiment, the face stock is a unitary coextrudate of two or more layers of polymeric material, an outer layer of which is a heat resistant polymer such as nylon 6. The heat resistant constructions are useful as electrophotographically printable labels and tapes.

14 Claims, No Drawings

U.S. PATENT DOCUMENTS

| | | | |
|---|---|---|---|
| 4,386,135 | 5/1983 | Campbell et al. | 428/447 |
| 4,389,450 | 6/1983 | Schaefer et al. | 428/212 |
| 4,393,115 | 7/1983 | Yoshii et al. | 428/323 |
| 4,398,985 | 8/1983 | Eageon | 156/233 |
| 4,402,172 | 9/1983 | Krueger | 53/425 |
| 4,405,401 | 9/1983 | Stahl | 156/248 |
| 4,407,897 | 10/1983 | Farrell et al. | 428/516 |
| 4,410,582 | 10/1983 | Tsunashima et al. | 428/212 |
| 4,424,256 | 1/1984 | Christensen et al. | 428/347 |
| 4,425,140 | 1/1984 | Farrell et al. | 428/516 |
| 4,429,015 | 1/1984 | Sheptak | 428/201 |
| 4,438,175 | 3/1984 | Ashcraft et al. | 428/315.5 |
| 4,440,824 | 4/1984 | Bonis | 428/216 |
| 4,463,861 | 8/1984 | Tsubone et al. | 215/12 R |
| 4,464,443 | 8/1984 | Farrell et al. | 428/688 |
| 4,472,227 | 9/1984 | Toyoda et al. | 156/244.11 |
| 4,478,663 | 10/1984 | O'Sullivan | 156/203 |
| 4,513,050 | 4/1985 | Akao | 428/200 |
| 4,517,044 | 5/1985 | Arnold | 156/277 |
| 4,522,887 | 6/1985 | Koebisu et al. | 428/461 |
| 4,525,416 | 6/1985 | Hammerschmidt et al. | 428/220 |
| 4,526,874 | 7/1985 | Grabowski geb. Marszalek et al. | 501/77 |
| 4,528,055 | 7/1985 | Hattemer | 156/247 |
| 4,529,654 | 7/1985 | Drum | 428/340 |
| 4,544,590 | 10/1985 | Egan | 428/40 |
| 4,551,380 | 11/1985 | Schoenberg | 428/218 |
| 4,568,403 | 2/1986 | Egan | 156/247 |
| 4,576,993 | 3/1986 | Tamplin et al. | 525/240 |
| 4,581,262 | 4/1986 | Karabedian | 428/38 |
| 4,582,736 | 4/1986 | Duncan | 428/40 |
| 4,582,752 | 4/1986 | Duncan | 428/317.9 |
| 4,585,679 | 4/1986 | Karabedian | 428/35 |
| 4,590,020 | 5/1986 | Itaba et al. | 264/22 |
| 4,617,241 | 10/1986 | Mueller | 428/520 |
| 4,621,009 | 11/1986 | Lad | 428/216 |
| 4,626,455 | 12/1986 | Karabedian | 428/35 |
| 4,626,460 | 12/1986 | Duncan | 428/40 |
| 4,650,721 | 3/1987 | Ashcraft et al. | 428/516 |
| 4,673,611 | 6/1987 | Crass et al. | 428/215 |
| 4,680,234 | 7/1987 | Kelch | 428/461 |
| 4,702,954 | 10/1987 | Duncan | 428/213 |
| 4,713,273 | 12/1987 | Freedman | 428/40 |
| 4,716,068 | 12/1987 | Selfried et al. | 428/141 |
| 4,724,186 | 2/1988 | Kelch | 428/344 |
| 4,770,931 | 9/1988 | Pollock et al. | 428/304.4 |
| 4,779,931 | 10/1988 | Miller et al. | 298/17 |
| 4,780,364 | 10/1988 | Wade et al. | 428/315.5 |
| 4,797,265 | 1/1989 | Garland et al. | 264/22 |
| 4,880,683 | 11/1989 | Stow | 428/354 X |
| 4,891,173 | 1/1990 | Saitoh et al. | 264/22 |
| 4,900,654 | 2/1990 | Pollock et al. | 430/533 |
| 4,935,288 | 6/1990 | Honaker et al. | 428/207 |
| 4,957,790 | 9/1990 | Warren | 428/34.9 |
| 5,006,378 | 4/1991 | Itaba et al. | 428/34.9 |
| 5,035,955 | 7/1991 | Matsukura et al. | 428/520 |
| 5,043,204 | 8/1991 | Itaba et al. | 428/213 |
| 5,055,371 | 10/1991 | Lee et al. | 430/126 |
| 5,064,893 | 11/1991 | Hoenigmann | 524/427 |
| 5,089,352 | 2/1992 | Garland et al. | 428/516 |
| 5,104,721 | 4/1992 | Sun | 428/206 |
| 5,104,731 | 4/1992 | Gager | 428/323 |
| 5,106,545 | 4/1992 | Warren | 264/22 |
| 5,135,261 | 8/1992 | Cusack et al. | 285/81 |
| 5,143,570 | 9/1992 | Freedman | 156/230 |
| 5,145,728 | 9/1992 | Itaba et al. | 428/213 |
| 5,151,493 | 9/1992 | Smith et al. | 428/345 X |
| 5,158,815 | 10/1992 | Doheny, Jr. et al. | 428/354 X |
| 5,183,705 | 2/1993 | Birkholz et al. | 428/343 |
| 5,194,455 | 3/1993 | Mossow et al. | 428/345 X |
| 5,298,302 | 3/1994 | Boice | 428/34.9 |
| 5,525,422 | 6/1996 | Spies et al. | 428/345 X |

HEAT RESISTANT PRESSURE SENSITIVE ADHESIVE CONSTRUCTIONS

This is a continuation of application Ser. No. 08/463,301 filed on Jun. 5, 1995, now abandoned.

The present invention relates to heat resistant, polymeric face stock for pressure sensitive adhesive constructions and, more particularly, to crosslinked polyolefin films and coextruded multilayer polymeric films suitable as electrophotographically printable face stock for pressure sensitive adhesive labels and tapes.

BACKGROUND OF THE INVENTION

Both paper and plastic film have been used extensively as print media for electrophotographic printers and copiers, including "laser printers" now used in offices and homes around the world. U.S. Pat. Nos. 4,770,931, 4,900,654, 5,055,371, and 5,104,731 describe several examples of electrophotographically printable polymer films.

In a typical electrophotographic imaging process, an image is printed (or copied) onto a paper or heat resistant film substrate by (1) depositing a uniform electric charge on a photoconductor drum in the dark; (2) exposing the drum to a pattern of light, thereby creating a latent image area; (3) developing the pattern by adding toner particles to the latent image area; (4) transferring toner particles to a paper or other medium as it is passed over the drum; (5) fusing the toner particles to the paper by applying heat thereto; and (6) cleaning the photoconductor drum. U.S. Pat. Nos. 4,071,362, 4,526,847, 4,621,009, 4,935,288, 5,104,721, and 5,135,261 describe coating materials for toner anchorage which can be used with a high temperature resistant substrate, usually a polyester film.

While a variety of materials are used as face stock for pressure sensitive adhesive labels and tapes, not all such materials are suitable for the wide range of calendaring, printing, and other processing steps currently used in the label and tape industry, including electrophotographic printing. Coated, bleached, kraft paper is probably the least expensive and most often used material for labels. In recent years, however, there has been tremendous demand for polymeric label face stock. Polymeric films generally do not tear as easily as paper labels, and are often more suitable for high speed label application processes. In addition, polymeric film labels are preferred for use on plastic containers, as they are generally more flexible and better able to conform to the container, and less likely to form wrinkles and creases.

Plastic film substrates are also desirable as electrophotographically printable, pressure sensitive adhesive label face stock. Necessarily, label face stock used in electrophotographic printing applications must be capable of surviving the high temperatures encountered in the fusing process. In a typical electrophotographic copier or printer, the fuser mechanism includes a heated roller and/or fuser bar, which has a temperature as high as 400° F. Ordinarily, a label or sheet of labels passing through an electrophotographic printer encounters the fuser bar only briefly, right before it exits the printer. However, if the printer "jams" as the label passes under the fuser bar, the encounter can last significantly longer. In that case, if the label face stock is not sufficiently heat resistant, i.e., does not have a melting point or glass transition point exceeding that of the fuser bar, it tends to melt and disintegrate, causing contamination of the paper path and considerable down time for cleaning. In some cases, separation (physical break down) of the face stock causes the label construction to delaminate, exposing adhesive to the fuser, and ruining the fuser.

Because of their easy printability and high heat resistance, polyvinyl chloride films are often used as label face stock, including electrophotographically printable face stock used, for example, in supermarket shelf marking labels, drum labels, and name plates. Polyester films are also widely used, both as electrophotographic print media and as face stock for printable, high temperature resistant labels.

Polyolefins, such as polyethylene and polypropylene, generally are more environmentally benign than polyvinyl chloride, and less expensive than polyesters, and have found use as label face stock in certain applications. For example, U.S. Pat. No. 5,064,893 describes calcium carbonate-filled polyethylene label stock having improved die cuttability. Until now, however, polyolefins have not been used as a replacement for vinyl or polyester in electrophotographic printing operations because they tend to melt and disintegrate under the fuser bar when the electrophotographic printer jams.

It can be seen, therefore, that a need exists for pressure sensitive adhesive label constructions that are capable of withstanding the high temperatures encountered in electrophotographic printers and copiers, but which are more environmentally friendly than polyvinyl chloride labels and less expensive than polyester labels.

One way in which the heat resistance of a polyolefin film can be improved is by crosslinking it, either thermally, radiatively (by, e.g., ultraviolet or electron beam irradiation) or both thermally and radiatively. European patent publication No. 0,490,854 A2 describes a process and apparatus for making crosslinked polyethylene using ultraviolet radiation. U.S. Pat. Nos. 3,741,253, 3,953,557, 4,031,162, 4,064,296, 4,224,262, 4,278,738, 4,576,993, 4,797,235, 4,957,790, 5,035,955, 5,089,352, and 5,106,545 describe crosslinked, heat shrinkable films. U.S. Pat. Nos. 4,891,173, 5,006,378, 5,043,204 and 5,145,728 describe clear, moisture proof, oriented, crosslinked polyethylene film. Incredibly, although crosslinked polyethylene has been known for decades, it appears that, until now, no one has ever used a crosslinked polyolefin as a face stock for a pressure sensitive adhesive label, suitable for use in electrophotographic printing processes.

SUMMARY OF THE INVENTION

The present invention provides heat resistant pressure sensitive adhesive labels, tapes, and similar constructions that are suitable for electrophotographic printing. The constructions have polymeric face stock that contains no polyvinyl chloride and is generally less expensive than polyester electrophotographic print media.

In one aspect of the invention, a heat resistant label or tape face stock is prepared by crosslinking one or more polyolefin films, preferably by electron beam irradiation. Heat resistant pressure sensitive adhesive labels and tapes are then prepared with such face stock in a conventional manner.

In another aspect of the invention, a heat resistant label or tape face stock is prepared by coextruding a plurality of polymeric layers, including a heat resistant outer layer. The cost of such a coextruded, multilayer polymeric face stock is minimized by using inexpensive polyolefins or other polymers for the inner layers of the face stock, and only a relatively thin outer layer of heat resistant material, such as a polyester or crosslinked polyolefin. Heat resistant pressure sensitive labels and tapes are prepared from such face stock in a conventional manner.

DETAILED DESCRIPTION OF THE INVENTION

In accordance with the present invention, a novel, heat resistant, pressure sensitive adhesive construction is provided. The construction, which can be a label, tape, decal, or similar article of manufacture, generally comprises a relatively thin sheet or film of heat resistant face stock, a pressure sensitive adhesive adhered to at least a portion of a first surface of the face stock, and a release surface releasably secured to the pressure sensitive adhesive. The face stock provides a printable surface for all manner of indicia, designs, and other markings, and imparts thickness and strength to the construction. The pressure sensitive adhesive renders the construction tacky, and the release surface protects the adhesive during shipment, storage and processing (e.g., calendering) of the construction.

In a first exemplary embodiment of the invention, the face stock comprises one or more layers of polymeric material, including an outer layer of at least one crosslinked polyolefin, which outer layer is "heat resistant." For the purposes of this disclosure, a material is considered to be "heat resistant" if it does not melt and disintegrate (i.e., experience gross mechanical failure and breakdown) when exposed to the elevated temperatures encountered in a typical electrophotographic printer fuser assembly, such as the heated roller and/or fuser bar found in most laser printers and similar machines. There are, of course, many makes and models of such machines, and the "average" fuser bar temperature of all machines has not been determined. It appears, however, that many commercially available laser printers have a fuser mechanism that is heated to a temperature of between about 175° and 200° C., or, as high as about 400° F. The "heat resistant" face stock described herein does not melt and disintegrate when exposed to such temperatures, at least for the short duration of time required to clear a pressure sensitive adhesive construction made of such material from the paper path of a "jammed" electrophotographic printer or copier.

A representative, but non-exclusive, list of polyolefins suitable for use as the heat resistant outer layer (or even the entire face stock) includes polyethylene, polypropylene, polybutene (e.g., poly 1-butene), ethylene copolymers (such as linear low density polyethylene and other copolymers of ethylene and another monomer or monomers, e.g., hexene, butene, octene, etc.), propylene copolymers, butylene copolymers, and compatible blends thereof. For the purposes of this disclosure, two polymeric materials are considered to be "compatible" if they are capable of existing in close and permanent physical association without exhibiting gross symptoms of polymer segregation. A polymer blend that is heterogenous on a macroscopic level is considered to be incompatible.

In the simplest example of this embodiment, the face stock is a single extruded layer of crosslinked polyolefin or blend of polyolefins. For example, heat resistant pressure sensitive adhesive constructions have been made using crosslinked high density polyethylene (HDPE) and crosslinked linear low density polyethylene (LLDPE) face stocks.

In a slightly more complex example of this embodiment of the invention, the face stock comprises a unitary coextrudate: a plurality of coextruded layers of polymeric materials, typically thermoplastic polymers and/or polymer blends, adhered to each other in a substantially permanent state. An outer layer of the unitary coextrudate comprises a crosslinked polyolefin or polyolefin blend, as described above. The other layer or layers of the coextrudate are polymers selected for one or more desirable properties, e.g., strength, modulus, cost, etc. A representative, but non-exclusive, list of polymeric materials suitable as the other layer or layers of the face stock includes polyolefins, polyesters, nylons, polystyrenes, acrylonitrile butadiene rubbers, other extrudable thermoplastics, and compatible blends thereof.

The multilayer face stock is prepared by simultaneously extruding a plurality of thermoplastic charges, at least one of which is a crosslinkable polyolefin or polyolefin blend that becomes the heat resistant outer layer of the face stock. Any suitable known type of coextrusion die can be used, including, for example, a Cloren "vane" die commonly used to form multilayer films used in food packaging and other applications.

Depending on the particular polymeric materials used to form the coextruded face stock, in some embodiments, it is advantageous to extrude, simultaneously, one or more charges of material which become "tie" layers between coextruded layers. In particular, where two layers of material would not otherwise sufficiently adhere or bond to each other when coextruded, a "tie" layer is coextruded with and between the two layers, to hold them together in a substantially permanent unitary state. For example, nylon 6 and polyethylene can be coextruded to form a substantially permanent, unitary coextrudate by simultaneously extruding nylon 6, polyethylene, and a polymer having good affinity for both materials, such as a modified polyethylene or an ethylene vinyl acetate copolymer. Such a polymer becomes a "tie" layer between the nylon 6 and polyethylene layers. In general, the choice of "tie" layer material depends, at least in part, on various properties of the materials to be joined, or "tied," together, including, for example, the materials' polar vs. nonpolar nature, modulus, flow properties, etc.

In both the single layer and multilayer embodiments described above, the face stock is crosslinked in a conventional manner, after being extruded. Preferably, crosslinking is accomplished by electron beam irradiation, using a conventional electron beam generator, such as a Van de Graaf high voltage election generator. A variety of other electron accelerators are known and can be employed to crosslink the polyolefin outer layer.

The dosage of electron beam radiation received by the face stock can be measured as a surface dosage and as an absorbed dosage. To measure surface dosage, a dosimeter is placed on or near the surface of the face stock that is exposed to the radiation source, in this case, an electron beam generator. To measure absorbed dosage, two dosimeters are used, with one placed above the surface of the face stock, on the same side as the radiation source, and the other dosimeter placed below the face stock.

In laboratory-extruded single layer films of polyethylene and polypropylene, polymer crosslinking sufficient to render the polyolefin films "heat resistant" generally is obtained by exposing the extruded polymer film to a surface dosage of between about 5 and 30 megarads (Mrad), preferably about 20 Mrad; or an absorbed dosage of between about 2 and 20 Mrad, preferably about 10 Mrad. It will be appreciated, however, that the minimum dosage of electron beam radiation required to render the outer layer of the face stock "heat resistant" can be reduced by including a chemical crosslinking agent within the melt of the pre-extruded polymeric material. Indeed, for some polyolefins, such as polypropylene, which are vulnerable to electron beam-induced chain scissioning, it is important to include the chemical crosslinking agent to obtain the desired level of polymer crosslinking. Nonlimiting examples of suitable crosslinking agents include multifunctional monomers such as acrylates and methacrylates.

Electron beam irradiation of the polyolefin face stock not only crosslinks the face stock, but also appears to increase the die cuttability of the face stock, which is believed to depend in part on the tensile strain of the face stock. Experiments performed on several samples of extruded polyolefin film face stocks, irradiated with varying dosages of electron beam radiation, indicate that an inverse relationship exists between electron beam dosage and tensile strain of the irradiated polyolefin films. That is, the tensile strain of polyolefin face stock decreased with increasing electron beam radiation dosage.

In an alternate embodiment of the invention, the face stock comprises a plurality of coextruded layers of polymeric material, including an outer layer of a heat resistant polymer such as nylon 6, polymethylpentene, polyethylene terephthalate, polybutylene terephthalate, copolyesters (such as Kodar Thermx crystallizable copolyester 6761, sold by Eastman Chemical Co.), polyamides, polyimides, and other polymers having a sufficiently high melting point or glass transition point, but excluding polyvinyl chloride. The other extruded layers of polymeric material are selected for their physical properties (e.g., strength, modulus, etc.) and/or cost. Nonlimiting examples of such polymeric materials include polyolefins, polyesters, nylons, polystyrenes, acrylonitrile butadiene rubbers, other extrudable thermoplastics, and compatible blends thereof.

The coextruded polymeric film face stock is prepared in a conventional manner by simultaneously extruding two or more charges of polymeric material, at least one of which is heat resistant, through a suitable extrusion die, such as the Cloren "vane" die described above. One or more "tie" layers can be included within the coextruded face stock, as necessary to ensure adherence between layers, as discussed above.

In some embodiments of the invention, it is advantageous to include one or more fillers to one or more layers of the face stock in order to improve or impart desirable properties to the face stock. For example, fillers such as calcium carbonate, mica, talc, titanium dioxide, aluminum oxide, and the like, can be included in the melt of the pre-extruded polymeric material to impart opacity, strength, and/or other properties to the film. The incorporation of various fillers in extruded polymeric films is well described in U.S. Pat. No. 4,713,273, which is incorporated herein by this reference.

It will also be appreciated that, in some embodiments of the invention, it is advantageous to hot-stretch the extruded polymeric films, prior to crosslinking, in order to provide machine direction orientation (MDO) of the film. A useful example of such hot-stretching is found in U.S. Pat. No. 4,713,273. In other applications, it is beneficial to biaxially orient the extruded films, prior to crosslinking. Biaxial orientation of thermoplastic films, like MDO, is well known. Stretching the extruded films can improve the mechanical properties of the face stock, including its modulus and strength.

In some embodiments of the invention, the face stock inherently has electrostatic properties that facilitate electrophotographic printing on labels, tapes, and other constructions made with the face stock. In other embodiments, it is advantageous to coat the outer layer of the extruded face stock with one or more coatings to improve ink and/or toner anchorage during electrophotographic printing. Examples of such coatings are found in some of the patents identified above. Alternatively (or, in some cases, conjunctively), the heat resistant outer surface of the face stock can be coronatreated in a conventional manner to improve the printability of the face stock.

The present invention provides heat resistant, pressure sensitive adhesive labels, tapes, and similar constructions, made from the above-described face stock by laminating the face stock to a pressure sensitive adhesive and release liner, using methods well known in the industry. Acrylic, rubber/resin-based, and other types of pressure sensitive adhesives can be used, depending on the ultimate end use of the construction and the processing steps (e.g., laminating) to which the construction is subjected. The pressure sensitive adhesive can be applied as a solventborne, aqueous emulsion, hot melt, or other coating, depending on the particular adhesive used. When necessary to improve adhesion between the face stock and adhesive, a conventional binder can be employed.

Similarly, the release surface has a conventional and well known nature, and comprises, for example, a silicone coated release liner (as used, for example, in labels and decals), a low adhesion backside of a self-wound pressure sensitive adhesive tape, or an interliner for a self-wound tape. In another embodiment, the release surface comprises a flexible backing made of the face stock described herein, coated with a low adhesion material such as a silicone polymer.

The following examples provide nonlimiting illustrations of the invention. In each case, extruded or coextruded polymeric film face stock was prepared, irradiated with electron beam radiation (Example 1 only), laminated to a pressure sensitive adhesive and release liner, cut to size, and fed through a laser printer, which was then intentionally jammed in order to test the heat resistance of the construction. Heat resistance of each sample was categorized based on a pass/fail scale. The criteria for tested samples were as follows:

Pass: The face stock did not separate (break apart) in the area exposed to the heated fuser bar, but remained continuous. Stretching or deformation of the face stock within or near the region exposed to the fuser bar was considered acceptable, so long as the face stock did not separate (break apart).

Fail: The face stock separated under the heat of the fuser. When face stock separates, it has a tendency to curl back on itself, expose adhesive, and stick to the fuser. Portions of face stock may tear off and adhere to the fuser.

Visual observation of the degree of separation or deformation of the face stock caused by the jam test was used to rank the samples (Example 1 only) within the Pass and Fail categories, using a ranking scale of 0 to 5. Samples below 2 showed separation and were considered to be unusable; anything above 2 did not separate; samples having a 5 ranking showed the best overall quality, with minimal deformation and only slight wrinkle formation.

EXAMPLE 1

Several samples of high density polyethylene (HDPE) and linear low density polyethylene (LLDPE) films were extruded, using a Killion extruder having a one inch screw diameter and a 25:1 length to diameter ratio. All films were approximately 3 mils thick. All but one of the samples were irradiated with electron beam radiation, using a belt-driven, Van de Graaf high voltage electron generator. Different samples received different doses of radiation, which was measured as a surface dosage. Label constructions were prepared by laminating the extruded, irradiated films (and the one non-irradiated sample) to a pressure sensitive adhesive consisting of about 20 g/m² of Flexcryl RE-49 adhesive (manufactured by Air Products & Chemicals, Inc., Allentown, Pa.) and 76 lb. (per ream) silicone-coated release liner. Each sample was cut into a 2"×10" rectangle, taped to a 8.5"×11" sheet of paper, and placed in the paper tray of an IBM Lexmark 4029 tabletop laser printer. Each sheet was then automatically fed through the printer until the sample was in direct contact with the fuser. At that point, the machine lid was opened, causing the sample to jam under the fuser, and the sample was left in contact with the fuser for five seconds before being removed. Upon removal from the laser printer, each sample was visually inspected for surface defects in the area of fuser contact, and ranked according to the point scale identified above. The results are presented in Table I.

TABLE I

| Face Stock (Polyolefin) | E-Beam Dosage (Mrad) | # of Samples Tested | Pass/Fail | Ranking (0–5) | Comments |
|---|---|---|---|---|---|
| HDPE | 0 | 1 | Fail | 0 | Significant separation of face stock |
| HDPE | 5 | 2 | Fail | 0 | Complete separation of face stock |
| HDPE | 10 | 2 | Pass | 3 | Deformation and wrinkles; no separation |
| HDPE | 15 | 2 | Pass | 3 | Slightly more deformation than 10 Mrad HDPE samples |
| HDPE | 20 | 2 | Pass | 4 | Slight wrinkling |
| LLDPE | 5 | 2 | Fail | 1 | Deformation and separation |
| LLDPE | 10 | 2 | Pass | 3 | Deformation and wrinkles; no separation |
| LLDPE | 15 | 2 | Pass | 5 | Little deformation; slight wrinkling |
| LLDPE | 20 | 3 | Pass | 5 | Little deformation; slight wrinkling |

EXAMPLE 2

A multilayer, heat resistant, polymeric face stock was prepared by coextruding nylon 6, high density polyethylene (HDPE), and a tie layer of Plexar 360 (a LLDPE-based material manufactured by Quantum Chemical Corp., Cincinnati, Ohio), using a Killion feedblock and an Extrusion Die, Inc. six inch wide film/sheet die heated to 500° F. Nylon 6 was extruded using a Killion ¾ inch extruder having a 25:1 length to diameter ratio; HDPE was extruded using a Killion one inch extruder having a 25:1 length to diameter ratio; and the tie layer was extruded using a Brabender ¾ inch extruder having a 25:1 length to diameter ratio. The coextruded film was approximately 2.5 mils thick, with approximately 80% of the thickness due to HDPE, 10% due to nylon 6 and 10% due to the tie layer. The extruded films were used as face stock to prepare label constructions by laminating a face stock to a pressure sensitive adhesive consisting of about 20 g/m² of Flexcryl RE-49 adhesivex (manufactured by Air Products & Chemicals, Inc.) and 76 lb. (per ream) silicone-coated release liner. Each sample was cut into a 2"×10" rectangle, taped to a 8.5"×11" sheet of paper, and placed in the paper tray of a an IBM Lexmark 4029 tabletop laser printer. Each sheet was then automatically fed through the printer until the sample was in direct contract with the fuser. At that point, the machine lid was opened, causing the sample to jam under the fuser, and the sample was left in contact with the fuser for 3 to 10 seconds before being removed. Upon removal from the laser printer, each sample was visually inspected for surface defects in the area of fuser contact, and ranked according to the point scale identified above. The results are presented in Table II.

TABLE II

| Face Stock | # of Samples Tested | Exposure Time (Seconds) | Pass/Fail | Comments |
|---|---|---|---|---|
| Nylon 6/tie/HDPE | 4 | 3 | Pass | Some deformation |
| Nylon 6/tie/HDPE | 2 | 10 | Pass | Significant deformation |

What is claimed is:

1. A heat resistant pressure sensitive adhesive construction, comprising:

a heat resistant face stock having a first surface and a second surface, comprising one or more layers of polymeric material, including an outer layer of at least one crosslinked polyolefin;

a pressure sensitive adhesive adhered to at least a portion of the first surface of the face stock; and a release surface releasably secured to the pressure sensitive adhesive wherein the heat resistant construction is suitable for electrophotographic printing.

2. A heat resistant construction as recited in claim 1, wherein the face stock inherently facilitates ink or toner anchorage during electrophotographic printing on the construction.

3. A heat resistant construction as recited in claim 1, further comprising a coating on the second surface of the face stock that improves ink or toner adhesion to the face stock.

4. A heat resistant construction as recited in claim 1, wherein said at least one crosslinked polyolefin is selected from the group of polyolefins consisting of polyethylene, polypropylene, polybutene, ethylene copolymers, propylene copolymers, butylene copolymers, and compatible blends thereof.

5. A heat resistant construction as recited in claim 1, wherein the crosslinked polyolefin is crosslinked high density polyethylene.

6. A heat resistant construction as recited in claim 1, wherein the crosslinked polyolefin is crosslinked low density polyethylene.

7. A heat resistant construction as recited in claim 1, wherein the crosslinked polyolefin is crosslinked linear low density polyethylene.

8. A heat resistant construction as recited in claim 1, wherein the crosslinked polyolefin is an electron beam-crosslinked polyolefin.

9. A heat resistant pressure sensitive adhesive construction, comprising:

an electron beam-crosslinked polyolefin or polyolefin blend face stock having a first surface and a second surface;

a pressure sensitive adhesive adhered to at least a portion of the first surface of the face stock; and a release surface releasably secured to the pressure sensitive adhesive wherein the heat resistant construction is suitable for electrophotographic printing.

10. A heat resistant construction as recited in claim 9, wherein the face stock further comprises one or more layers of polymeric material, each of which is coextruded with the polyolefin prior to crosslinking.

11. A heat resistant, pressure sensitive adhesive construction, comprising:

a heat resistant face stock having a first surface and a second surface, comprising a crosslinked polyolefin or polyolefin blend;

a pressure sensitive adhesive adhered to at least a portion of the first surface of the face stock; and a release surface releasably secured to the pressure sensitive adhesive wherein the heat resistant construction is suitable for electrophotographic printing.

12. A heat resistant pressure sensitive adhesive construction comprising:

a face stock having a first surface and a second surface and comprised of a plurality of coextruded polymeric layers, including an outer layer comprised of a heat resistant crosslinked polyolefin or polyolefin blend;

a pressure sensitive adhesive layer having a top surface and a bottom surface, said top surface being adhered to the first surface of the face stock; and a release surface releasably secured to the bottom surface of the pressure sensitive adhesive layer wherein the heat resistant construction is suitable for electrophotographic printing.

13. The heat resistant pressure sensitive adhesive construction of claim 12 wherein the crosslinked polyolefin or polyolefin blend comprises crosslinked polyolefins selected from the group consisting of polyethylene, polypropylene, polybutene, ethylene copolymers, propylene copolymers, butylene copolymers and compatible blends thereof.

14. The heat resistant pressure sensitive adhesive construction of claim 12 wherein the crosslinked polyolefin is a cross-linked polyethylene.

* * * * *